(12) United States Patent
Kanamaru et al.

(10) Patent No.: US 7,459,503 B2
(45) Date of Patent: Dec. 2, 2008

(54) PROCESS FOR PRODUCTION OF MODIFIED PROPYLENE POLYMERS AND MODIFIED PROPYLENE POLYMERS PRODUCED BY THE PROCESS

(75) Inventors: Masami Kanamaru, Chiba (JP); Yutaka Minami, Chiba (JP); Ryo Aburatani, Chiba (JP); Tomio Tatsumi, Chiba (JP); Takenori Fujimura, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 402 days.

(21) Appl. No.: 10/509,329

(22) PCT Filed: Apr. 11, 2003

(86) PCT No.: PCT/JP03/04631

§ 371 (c)(1),
(2), (4) Date: Mar. 29, 2005

(87) PCT Pub. No.: WO03/087172

PCT Pub. Date: Oct. 23, 2003

(65) Prior Publication Data

US 2005/0171295 A1 Aug. 4, 2005

(30) Foreign Application Priority Data

Apr. 12, 2002 (JP) ............................. 2002-110327

(51) Int. Cl.
*C08F 8/06* (2006.01)
*C08F 8/46* (2006.01)

(52) U.S. Cl. .................. 525/386; 525/301; 525/386; 525/263

(58) Field of Classification Search .............. 525/301, 525/386, 263, 387
See application file for complete search history.

(56) References Cited

U.S. PATENT DOCUMENTS 3,616,047 A * 10/1971 Kehe .................... 156/334
4,159,287 A * 6/1979 Ames ..................... 525/301
5,698,637 A 12/1997 Aarila
5,998,547 A * 12/1999 Hohner ................... 525/301
6,262,182 B1 7/2001 Eagan et al.
6,310,134 B1 * 10/2001 Templeton et al. ......... 524/531

FOREIGN PATENT DOCUMENTS

| DE | 196 48 895 A1 | 5/1998 |
|---|---|---|
| EP | 0 612 773 A1 | 8/1994 |
| EP | 0 903 356 A1 | 3/1999 |
| EP | 1 095 951 A1 | 5/2001 |
| JP | 55-050007 | 4/1980 |
| JP | 59-217709 | 12/1984 |
| JP | 3-168206 | 7/1991 |
| JP | 10-1513 | 1/1998 |
| JP | 2000-169528 | 6/2000 |
| JP | 2000-234004 | 8/2000 |
| WO | WO 00/00558 | 1/2000 |

OTHER PUBLICATIONS

Database WPI, AN 1989-297896, XP-002332430, JP 01-221475, Sep. 4, 1989.

* cited by examiner

*Primary Examiner*—Ling-Siu Choi
(74) *Attorney, Agent, or Firm*—Oblon, Spivak, McClelland, Maier & Neustadt, P.C.

(57) ABSTRACT

The present invention relates to a method for producing a modified propylene-based polymer containing modifying a propylene-based polymer by a radical initiator and an organic acid, a modified propylene-based polymer obtained by the method, and an adhesive composition containing the modified propylene-based polymer. The propylene-based polymer is a propylene homopolymer satisfying the conditions of (a) mmmm=20 to 60 mol %, (b) [rrrr/(1-mmmm)]≦0.1, (c) rmrm>2.5 mol %, (d) mmxrr/(mr)$^2$≦2.0, and (e) the weight ratio (W25) of components eluted at 25° C. or lower in a temperature programmed chromatography is 20 to 100% by weight, or a propylene copolymer satisfying the condition of (h) the stereoregularity index (P) obtained by $^{13}$C-NMR measurement is 55 to 90 mol %.

The modified propylene-based polymer of the invention can make a polyolefin, etc. more adhesive, stronger, or flexible, to be useful for a high-adhesive sealant or an polyolefin with increased compatibility to an inorganic filler, etc., particularly as a resin for a hot-melt adhesive.

9 Claims, No Drawings

PROCESS FOR PRODUCTION OF MODIFIED PROPYLENE POLYMERS AND MODIFIED PROPYLENE POLYMERS PRODUCED BY THE PROCESS

TECHNICAL FIELD

The present invention relates to a method for producing a modified propylene homopolymer or a modified propylene copolymer (which may be hereinafter referred to as a modified propylene-based polymer generically), a modified propylene-based polymer obtained by the method, and an adhesive composition comprising the modified propylene-based polymer.

The invention relates more particularly to a method for efficiently producing a modified propylene-based polymer useful as a high-adhesive sealant, a polyolefin modifier for providing a polyolefin with increased compatibility with an inorganic filler, etc., or a polyolefin finishing agent, etc., a modified propylene-based polymer obtained by the method, and an adhesive composition comprising the modified propylene-based polymer.

BACKGROUND ART

Olefin-based polymers obtained by graft-modifying a polyolefin such as a polyethylene and a polypropylene with an unsaturated carboxylic acid or an anhydride thereof, etc. have been used as a modifier or an adhesiveness-increasing agent for various resins, etc.

A low-regular polypropylene produced using a metallocene catalyst is blended with a polypropylene produced using a magnesium-titanium catalyst to control elasticity, and the resulting blend is promising as a material for a heat-sealing layer of a multi-layered film, etc. However, a polypropylene with higher strength and higher adhesiveness has been demanded.

An object of the present invention is, under such circumstances, to provide a modifier, which is capable of making a polyolefin, etc. more adhesive, stronger, or flexible, and is useful for preparing a high-adhesive sealant, for increasing compatibility of a polyolefin with an inorganic filler, etc.

DISCLOSURE OF THE INVENTION

As a result of intense research in view of developing a modifier having the above function, the inventors have found that the above object can be achieved by modifying a propylene homopolymer or a propylene copolymer (which may be hereinafter referred to as a propylene-based polymer generically) having a particular property with a radical initiator and an organic acid.

The present invention has been accomplished by this finding.

Thus, according to the invention, there are provided the following methods for producing modified propylene-based polymers, and modified propylene-based polymers obtained by the methods.

1. A method for producing a modified propylene homopolymer, characterized in that a propylene homopolymer is modified by a radical initiator and an organic acid, the propylene homopolymer satisfying the conditions of (a) mmmm=20 to 60 mol %, (b) [rrrr/(1-mmmm)]≦0.1, (c) rmrm>2.5 mol %, (d) mmxrr/(mr)²≦2.0, and (e) the weight ratio (W25) of components eluted at 25° C. or lower in a temperature programmed chromatography is 20 to 100% by weight.

2. The method for producing a modified propylene homopolymer according to 1, wherein the propylene homopolymer satisfies the further conditions of (f) the molecular weight distribution (Mw/Mn) measured by a gel permeation chromatography (GPC) is 5 or less, and/or (g) the limiting viscosity [η] measured in tetralin at 135° C. is 0.1 dL/g or more.

3. A method for producing a modified propylene copolymer, characterized in that a propylene copolymer is modified by a radical initiator and an organic acid, the propylene copolymer satisfying the condition of (h) the stereoregularity index (P) obtained by $^{13}$C-NMR measurement is to 90 mol %.

4. The method for producing a modified propylene copolymer according to 3, wherein the propylene copolymer satisfies the further conditions of (i) the molecular weight distribution (Mw/Mn) measured by a gel permeation chromatography (GPC) is 5 or less, and/or (j) the limiting viscosity [η] measured in tetralin at 135° C. is 0.1 dL/g or more.

5. The method for producing a modified propylene homopolymer or a modified propylene copolymer according to 1 or 3, wherein the propylene homopolymer or the propylene copolymer is modified in an organic solvent.

6. The method for producing a modified propylene homopolymer or a modified propylene copolymer according to 1 or 3, wherein the propylene homopolymer or the propylene copolymer is modified in the molten state.

7. The method for producing a modified propylene homopolymer or a modified propylene copolymer according to 1 or 3, wherein the radical initiator is a peroxide, and the organic acid is maleic anhydride, acrylic acid, or an alkyl acrylate.

8. The method for producing a modified propylene homopolymer or a modified propylene copolymer according to 1 or 3, wherein the propylene homopolymer or the propylene copolymer is modified in the presence of a styrene-based compound.

9. A modified propylene homopolymer obtained by the method according to 1.

10. A modified propylene copolymer obtained by the method according to 3.

11. An adhesive composition comprising the modified propylene homopolymer according to 9.

12. The hot-melt adhesive composition according to 11, wherein the adhesive composition comprises 20 to 99% by weight of the modified propylene homopolymer and 1 to 80% by weight of a tackifying resin.

13. An adhesive composition comprising the modified propylene copolymer according to 10.

14. The hot-melt adhesive composition according to 13, wherein the adhesive composition comprises 20 to 99% by weight of the modified propylene copolymer and 1 to 80% by weight of a tackifying resin.

BEST MODE FOR CARRYING OUT THE INVENTION

The present invention is described in detail below.
In the method of the invention for producing a modified propylene homopolymer or a modified propylene copolymer, a propylene homopolymer or a propylene copolymer is used as a starting material to be modified.

The propylene homopolymer used in the invention has the following characteristics of (a) to (e):
(a) the meso pentad fraction (mmmm) is 20 to 60 mol %,
(b) the racemic pentad fraction (rrrr) and (1-mmmm) satisfy the following expression: [rrrr/(1-mmmm)]≦0.1, (c) the pentad fraction (rmrm) is more than 2.5 mol %,
(d) the meso triad fraction (mm), the racemic triad fraction (rr), and the triad fraction (mr) satisfy the following expression: mm×rr/(mr)$^2$≦2.0, and
(e) the weight ratio (W25) of components eluted at 25° C. or lower in a temperature programmed chromatography is 20 to 100% by weight.

When the propylene homopolymer satisfying the above conditions is used in the invention, the resultant film or sheet is excellent in balance between the content of sticky components, low elastic modulus, and transparency.

Thus, the film or sheet has a low elastic modulus, an excellent flexibility (or softness), a smaller amount of sticky components, excellent surface properties (including less bleeding and transfer of the sticky components to another article), and an excellent transparency.

The propylene homopolymer satisfying the condition of (c) has a higher polymer randomness and an improved transparency.

Further, the expression of (d) is an index of polymer randomness. The randomness is higher as the value of mm×rr/(mr) 2 is closer to 1, and the polymer with such higher randomness is more transparent and excellent in the balance between softness and elastic recovery rate.

The propylene homopolymer preferably satisfies the above condition of (d), and the value of mm×rr/(mr)$^2$ is more preferably 0.5 to 1.8, further preferably 0.5 to 1.5.

The meso pentad fraction (mmmm), the racemic pentad fraction (rrrr), and the pentad fraction (rmrm) are measured according to a method proposed in A. Zambelli, et al., *Macromolecules*, 6, 925 (1973) using methyl signals in $^{13}$C-NMR spectrum, and mean a meso fraction, a racemic fraction, and a racemic-meso-racemic-meso fraction of the polypropylene molecular chain by the pentad units, respectively.

The larger meso pentad fraction (mmmm) means a higher stereoregularity.

When the propylene homopolymer used in the invention has a meso pentad fraction (mmmm) of less than 20 mol %, the propylene homopolymer is sticky.

When the meso pentad fraction (mmmm) is more than 60 mol %, the propylene homopolymer disadvantageously has a high elastic modulus in some cases.

The value of [rrrr/(1-mmmm)] is obtained from the above pentad fractions, and is an index indicating uniformity of the regularity distribution of the propylene homopolymer.

When the value becomes lager, the regularity distribution is broadened, and the propylene homopolymer becomes a mixture of a high-stereoregular polypropylene and an atactic polypropylene as a conventional polypropylene produced by using a known catalyst system, to have an increased stickiness and a reduced transparency.

When the value of [rrrr/(1-mmmm)] of the propylene homopolymer used in the invention is more than 0.1, the propylene homopolymer is sticky in some cases.

Further, when the racemic-meso-racemic-meso fraction (rmrm) is less than 2.5 mol %, the transparency is reduced.

When the value of [mm×rr/(mr)$^2$] in the expression of (d) is more than 2, the transparency is reduced, and the balance between the softness and the elastic recovery rate is deteriorated.

The $^{13}$C-NMR spectrum is measured by using the following apparatus under the following conditions according to peak assignment proposed in A. Zambelli, et al., *Macromolecules*, 8, 687 (1975).

Apparatus: JNM-EX400 $^{13}$C-NMR spectrometer manufactured by JEOL Ltd.
Method: Complete proton decoupling method
Concentration: 220 mg/mL
Solvent: 90/10 (volume ratio) mixed solvent of 1,2,4-trichlorobenzene/heavy benzene
Temperature: 130° C.
Pulse width: 45°
Pulse interval: 4 seconds
Integration: 10,000 times <Calculating Formula>

$$M=(m/S)\times 100$$

$$R=(r/S)\times 100$$

$$S=P\beta\beta+P\alpha\beta+P\alpha\gamma$$

S: Total signal intensity of methyl carbon atoms in side chains of propylene units
Pββ: 19.8 to 22.5 ppm
Pαβ: 18.0 to 17.5 ppm
Pαγ: 17.5 to 17.1 ppm
r: Racemic pentad chain: 20.7 to 20.3 ppm
m: Meso pentad chain: 21.7 to 22.5 ppm The propylene homopolymer used in the invention is such that, in a temperature programmed chromatography, the weight ratio (W25) of the components eluted at 25° C. or lower to the homopolymer is 20 to 100% by weight.

The weight ratio W25 is preferably 30 to 100% by weight, particularly 50 to 100% by weight.

The W25 is an index indicating the softness of the propylene homopolymer.

A smaller weight ratio W25 means that high elastic modulus components and/or the stereoregularity distribution non-uniformity are increased.

In the invention, when the weight ratio W25 is less than 20%, the propylene homopolymer is disadvantageously poor in the softness in some cases.

An elution curve is obtained by a temperature programmed chromatography using the following operation processes, apparatus, and measuring conditions, and the W25 is a weight ratio (% by weight) of components, which are not adsorbed onto column packing and are eluted at a TREF column temperature of 25° C., in the elution curve.

(1) Operation Processes

A sample solution is introduced into a TREF column with a controlled temperature of 135° C., gradually cooled to 0° C. at a cooling rate of 5° C./hour, and held for 30 minutes to crystallize the sample on the packing.

Then, the column is heated to 135° C. at a heating rate of 40° C./hour to obtain an elution curve.

(2) Apparatus

TREF column: Silica gel column (4.6φ×150 mm) available from GL Science Co., Ltd.

Flow cell: KBr cell with 1-mm optical path available from GL Science Co., Ltd.

Feed pump: SSC-3100 pump available from Senshu Kagaku Co., Ltd.

Valve oven: MODEL 554 oven (high-temperature type) available from GL Science Co., Ltd.

TREF oven: available from GL Science Co., Ltd.

Two-line temperature controller: REX-C100 available from Rigaku Kogyo Co., Ltd.

Detector: IR detector for liquid chromatography MIRAN 1A CVF available from Foxboro Co., Ltd.

10-Way valve: Electric valve available from Balco Co., Ltd.

Loop: 500-μL loop available from Balco Co., Ltd.

(3) Measuring Conditions
   Solvent: o-Dichlorobenzene
   Sample concentration: 7.5 g/L
   Injection amount: 500 μL
   Pumping flow: 2.0 mL/minute
   Detection wave number: 3.41 μm
   Column packing: Chromosorb P (30 to 60 mesh)
   Column temperature distribution: Within ±0.2° C.

In the invention, the propylene homopolymer preferably satisfies the following conditions:
(a') the meso pentad fraction (mmmm) is 30 to 50 mol %;
(b') the racemic pentad fraction (rrrr) and (1-mmmm) satisfy the expression [rrrr/(1-mmmm)]≦0.08;
(c') the racemic-meso-racemic-meso fraction (rmrm) is more than 2.7 mol %;
(d') the meso triad fraction (mm), the racemic triad fraction (rr), and the meso-racemic fraction (mr) satisfy the expression mm×rr/(mr)$^2$≦1.8; and
(e') the weight ratio (W25) of components eluted at 25° C. or lower in the temperature programmed chromatography is 30 to 100% by weight.

Further, the propylene homopolymer particularly preferably satisfies the following conditions:
(a'') the meso pentad fraction (mmmm) is 30 to 50 mol %;
(b'') the racemic pentad fraction (rrrr) and (1-mmmm) satisfy the expression [rrrr/(1-mmmm)]≦0.06;
(c'') the racemic-meso-racemic-meso fraction (rmrm) is more than 2.8 mol %;
(d'') the meso triad fraction (mm), the racemic triad fraction (rr), and the meso-racemic fraction (mr) satisfy the expression mm×rr/(mr)$^2$≦1.6; and
(e'') the weight ratio (W25) of components eluted at 25° C. or lower in the temperature programmed chromatography is 50 to 100% by weight.

The propylene homopolymer used in the invention preferably has a molecular weight distribution (Mw/Mn) of 5 or less measured by a gel permeation chromatography (GPC) and/or a limiting viscosity [η] of 0.1 dL/g or more measured in tetralin at 135° C. in addition to the above characteristics. The value of Mw/Mn is more preferably 4 or less, particularly preferably 3.5 or less.

When the molecular weight distribution (Mw/Mn) is more than 5, the film or sheet of the homopolymer is sticky in some cases.

The molecular weight distribution Mw/Mn is calculated from a weight average molecular weight Mw and a number average molecular weight Mn, which are measured based on a polyethylene standard by the gel permeation chromatography (GPC) using the following apparatus and conditions.

<GPC Apparatus>
   Column: TOSO GMHHR-H(S)HT
   Detector: RI detector WATERS 150C for liquid chromatogram Measuring Conditions
   Solvent: 1,2,4-Trichlorobenzene
   Measuring temperature: 145° C.
   Flow rate: 1.0 mL/minute
   Sample concentration: 2.2 mg/mL
   Injection amount: 160 μL
   Calibration curve: Universal Calibration
   Analysis program: HT-GPC (Ver. 1.0)

In general, the polymerization of propylene proceeds via so-called 1,2-insertion such that the methylene carbon atom of a propylene monomer is bonded to the active site of a catalyst, and further propylene monomers are sequentially coordinated in the same manner and polymerized. However, a propylene monomer is rarely polymerized via 2,1- or 1,3-insertion (abnormal insertion).

In the propylene homopolymer used in the present invention, it is preferred that the 2,1- and 1,3-insertions are minimized.

The contents of these insertions preferably satisfy the following expression (1):

$$[(m\text{-}2,1)+(r\text{-}2,1)+(1,3)] \leq 5.0\ (\%) \quad (1)$$

wherein (m-2,1) represents a content (%) of meso-2,1-insertion measured by $^{13}$C-NMR, (r-2,1) represents a content (%) of racemic 2,1-insertion measured by $^{13}$C-NMR, and (1,3) represents a content (%) of 1,3-insertion measured by $^{13}$C-NMR. The contents more preferably satisfy the following expression (2):

$$[(m\text{-}2,1)+(r\text{-}2,1)+(1,3)] \leq 1.0\ (\%) \quad (2)$$

and most preferably satisfy the following expression (3):

$$[(m\text{-}2,1)+(r\text{-}2,1)+(1,3)] \leq 0.1\ (\%) \quad (3)$$

When the contents do not satisfy the expression (1), the propylene homopolymer is poorer in crystallinity than expected to be sticky in some cases.

The insertion contents (m-2,1), (r-2,1) and (1,3) are obtained from integrated intensities of $^{13}$C-NMR peaks, which are assigned based on Grassi, et al., *Macromolecules*, 21, p. 617 (1988) and Busico, et al., *Macromolecules*, 27, p. 7538 (1994).

Thus, the content (m-2,1) is a meso-2,1-insertion content (%) calculated from a ratio of the integrated intensity of a Pα, γ threo peak around 17.2 ppm to the total integrated intensity of the entire methyl carbon region.

The content (r-2,1) is a racemic-2,1-insertion content (%) calculated from a ratio of the integrated intensity of a Pα, γ threo peak around 15.0 ppm to the total integrated intensity of the entire methyl carbon region.

The content (1,3) is a 1,3-insertion content (%) calculated from a ratio of the integrated intensity of a Tβ, γ+ peak around 31.0 ppm to the total integrated intensity of the entire methyl carbon region.

Further, it is more preferred that the propylene homopolymer used in the invention shows substantially no peak attributable to a molecular chain end (a n-butyl group) of the 2,1-insertion in the $^{13}$C-NMR spectrum.

The $^{13}$C-NMR peak of the molecular chain end of the 2,1-insertion is assigned based on Jungling, et al., *J. Polym. Sci.: Part A: Polym. Chem.*, 33, P1305 (1995), and the content of the insertion is calculated from the integrated intensity of the peak.

In the case of isotactic polypropylenes, a peak around 18.9 ppm is assigned to the end methyl carbon of the n-butyl group.

The $^{13}$C-NMR spectrum for determining the abnormal insertions and the molecular chain end may be measured by the above apparatus under the above conditions.

Further, the propylene homopolymer used in the invention preferably satisfies the condition that the weight ratio of components extractable with boiling diethyl ether, an index of the elastic modulus, is 5% by weight or more, in addition to the above conditions.

The weight ratio of components extractable with boiling diethyl ether is measured by a Soxhlet extractor under the following conditions.
   Sample amount: 1 to 2 g
   Sample form: Powder (pellet is pulverized into powder)
   Extracting solvent: Diethyl ether
   Extraction time: 10 hours
   Extraction number: 180 times or more Extracted ratio: Calculated by the equation [Weight of components extracted with diethyl ether (g)/Weight of used powder (g)]×100

The propylene homopolymer used in the invention preferably has a tensile elasticity of 100 MPa or less, more preferably has a tensile elasticity of 70 MPa or less, in addition to the above characteristics.

The propylene copolymer used in the invention has the characteristic of (h) the stereoregularity index (P) obtained by $^{13}$C-NMR measurement is 55 to 90 mol %.

When the propylene copolymer satisfying the above condition of (h) is used in the invention, the resultant film or sheet is excellent in balance between the content of sticky components, low elastic modulus, and transparency.

Thus, the film or sheet has a low elastic modulus, an excellent flexibility (or softness), a smaller amount of sticky components, excellent surface properties (including less bleeding and transfer of the sticky components to another article), and an excellent transparency.

The stereoregularity index (P) is obtained such that the $^{13}$C-NMR spectrum of the propylene copolymer is measured by using the above JNM-EX400 $^{13}$C-NMR spectrometer manufactured by JEOL Ltd. under the above conditions, and the meso triad fraction (mm) of the propylene chain is calculated from the spectrum.

A larger stereoregularity index (P) means that the propylene copolymer has a higher stereoregularity.

The propylene copolymer used in the invention more preferably has a stereoregularity index (P) of 65 to 80 mol %.

When the stereoregularity index (P) is less than 55 mol %, the propylene copolymer has too small elastic modulus, resulting in poor moldability in some cases.

When the stereoregularity index (P) is more than 90 mol %, there is a case where the propylene copolymer is not soft but hard.

Further, the weight ratio W25 of the propylene copolymer is more preferably 30 to 100% by weight, particularly preferably 50 to 100% by weight.

When the weight ratio W25 is less than 20%, the propylene copolymer is poor in the softness in some cases.

The weight ratio W25 has the same meanings as above, and is measured in the above manner.

Further, it is preferred that the propylene copolymer has a melting endotherm ΔH of 20 J/g or less measured by DSC to be excellent in the softness, in addition to the above characteristics.

The melting endotherm ΔH is an index indicating the softness. A larger melting endotherm ΔH means that the propylene copolymer has a higher elastic modulus and a reduced flexibility.

The propylene copolymer may have a melting point (Tm) and a crystallization point (Tc). It is preferred that the propylene copolymer does not show the Tm and Tc, or the propylene copolymer has a low Tm and Tc, from the viewpoint of the flexibility. Particularly, the Tm is preferably 100° C. or less.

The Tm, Tc, and ΔH are determined by DSC measurement.

Thus, for example, by using a differential scanning colorimeter DSC-7 available from Perkin-Elmer Corp., 10 mg of a sample is melted at 230° C. for 3 minutes under nitrogen atmosphere, and then cooled to 0° C. at 10° C./minute.

The peak top of the maximum peak in the obtained crystallization exotherm curve is the crystallization point Tc.

Further, a sample is kept at 0° C. for 3 minutes and heated at 10° C./minute to obtain a melting endotherm curve, and the peak top of the maximum peak in the melting endotherm curve is the melting point Tm, and the melting endotherm is the ΔH.

The propylene copolymer used in the invention preferably satisfies the condition that the weight ratio of components extractable with boiling diethyl ether, an index of the elastic modulus, is 5% by weight or more, in addition to the above conditions.

The weight ratio of components extractable with boiling diethyl ether is measured in the above-described manner.

Further, the tensile elasticity of the propylene copolymer is preferably 100 MPa or less, more preferably 70 MPa or less.

Specific examples of the propylene copolymers used in the invention include copolymers of propylene and ethylene, and/or an α-olefin having 4 to 20 carbon atoms.

Examples of the α-olefin having 4 to 20 carbon atoms include 1-butene, 1-pentene, 4-methyl-1-pentene, 1-hexene, 1-octene, 1-decene, 1-dodecene, 1-tetradecene, 1-hexadecene, 1-octadecene, and 1-eicocene. These α-olefins may be used alone or in combination of two or more.

The propylene copolymer is preferably a random copolymer.

The content of structural units derived from propylene is preferably 90 mol % or more, more preferably 95 mol % or more.

The propylene copolymer preferably satisfies the conditions of (i) the molecular weight distribution (Mw/Mn) measured by a gel permeation chromatography (GPC) is 5 or less, and/or (j) the limiting viscosity [η] measured in tetralin at 135° C. is 0.1 dL/g or more, in addition to the above conditions. The limiting viscosity [η] is more preferably 0.4 dL/g or more.

The molecular weight distribution Mw/Mn is more preferably 4 or less, particularly preferably 3.5 or less.

When the molecular weight distribution Mw/Mn is more than 5, the film or sheet of the copolymer is sticky in some cases.

Methods for producing the propylene-based polymers, which have the above characteristics to be used as a material in the invention, are hereinafter described in detail.

In the method of the invention for producing a modified propylene-based polymer, the propylene-based polymer is modified by using a radical initiator and an organic acid.

An unsaturated carboxylic acid or a derivative thereof may be used as the organic acid for the modification.

Examples of the unsaturated carboxylic acids include acrylic acid, methacrylic acid, maleic acid, fumaric acid, itaconic acid, crotonic acid, citraconic acid, sorbic acid, measaconic acid, angelic acid, etc.

The derivative of the unsaturated carboxylic acid may be an acid anhydride, an ester, an amide, an imide, a metal salt, etc., and examples thereof include maleic anhydride, itaconic anhydride, citraconic anhydride, methyl acrylate, methyl methacrylate, ethyl acrylate, butyl acrylate, 2-ethylhexyl acrylate, monoethyl maleate, acrylamide, maleic acid monoamide, maleimide, N-butylmaleimide, sodium acrylate, sodium methacrylate, etc.

Particularly preferred among them are maleic anhydride and acrylic acid.

These organic acids may be used alone or in combination of two or more.

The radical initiator is not particularly limited, and may be appropriately selected from known ones including organic peroxides, azo compounds such as azobisisobutyronitrile and azobisisovaleronitrile, etc. The radical initiator is preferably an organic peroxide.

Examples of the organic peroxides include diacyl peroxides such as dibenzoyl peroxide, di-3,5,5-trimethylhexanoyl peroxide, dilauroyl peroxide, didecanoyl peroxide, and di(2,4-dichlorobenzoyl)peroxide; hydroperoxides such as t-butyl hydroperoxide, cumene hydroperoxide, diisopropylbenzene hydroperoxide, and 2,5-dimethylhexane-2,5-dihydroperoxide; dialkyl peroxides such as di-t-butyl peroxide, dicumyl peroxide, 2,5-dimethyl-2,5-di(t-butylperoxy)hexane, 2,5-dimethyl-2,5-di(t-butylperoxy)hexyne-3, and α,α'-bis(t-butylperoxy)diisopropylbenzene; peroxyketals such as 1,1-bis-t-butylperoxy-3,3,5-trimethylcyclohexane and 2,2-bis(t-butylperoxy)butane; alkyl peresters such as t-butyl peroxyoctate, t-butyl peroxypivalate, t-butyl peroxyneodecanoate, and t-butyl peroxybenzoate; peroxycarbonates such as di-2-ethylhexyl peroxydicarbonate, diisopropyl peroxydicarbonate, di-sec-butyl peroxydicarbonate, and t-butyl peroxyisopropylcarbonate; etc.

Among the organic peroxides, dialkyl peroxides are preferred.

These organic peroxides may be used alone or in combination of two or more.

Specific examples of the commercial products of the organic peroxides include products available from NOF Corporation such as PERHEXYNE 25B, PERBUTYL D, PERBUTYL C, PERHEXA 25B, PERCUMYL D, PERBUTYL P, PERBUTYL H, PERHEXYL H, PERCUMYL H, PEROCTA H, PERCUMYL P, PERMENTA H, PERBUTYL SM, PERMEK N, PEROMER AC, PERHEXA V, PERHEXA 22, PERHEXA CD, PERTETRA A, PERHEXA C, PERHEXA 3M, PERHEXA HC, PERHEXA TMH, PERBUTYL IF, PERBUTYL Z, PERBUTYL A, PERHEXYL Z, PERHEXA 25Z, PERBUTYL E, PERBUTYL L, PERHEXA 25MT, PERBUTYL I, PERBUTYL 355, PERBUTYL MA, PERHEXYL I, PERBUTYL IB, PERBUTYL O, PERHEXYL O, PERCYCLO O, PERHEXA 250, PEROCTA O, PERBUTYL PV, PERHEXYL PV, PERBUTYL ND, PERHEXYL ND, PERCYCLO ND, PEROCTA ND, PERCUMYL ND, DYPER ND, PEROYL SOP, PEROYL OPP, PEROYL MBP, PEROYL EEP, PEROYL IPP, PEROYL NPP, PEROYL TCP, PEROYL IB, PEROYL SA, PEROYL S, PEROYL O, PEROYL L, PEROYL 355, NYPER BW, NYPER BMT, and NYPER CS.

There are no particular restrictions in the amounts of the organic acid and the radical initiator, and the amounts are appropriately selected depending on the desired physical properties of the modified propylene-based polymer. Based on 100 parts by weight of the propylene-based polymer, the amount of the organic acid is generally 0.1 to 50 parts by weight, preferably 0.1 to 30 parts by weight, and the amount of the radical initiator is generally 0.01 to 10 parts by weight, preferably 0.01 to 5 parts by weight.

The method for modifying the propylene-based polymer is not particularly limited. For example, the propylene-based polymer, the organic acid, and the radical initiator may be melt-mixed and reacted by using a roll mill, a Banbury mixer, an extruder, etc. at 150 to 300° C., preferably at 140 to 250° C., for 0.01 to 0.5 hours, to modify the propylene-based polymer. Alternatively, they may be reacted at −50 to 300° C., preferably at 40 to 180° C., for 0.1 to 2 hours in or without an organic solvent such as a hydrocarbon solvent (butane, pentane, hexane, cyclohexane, toluene, etc.), a halogenated hydrocarbon solvent (chlorobenzene, dichlorobenzene, trichlorobenzene, etc.), and a liquid α-olefin.

In the invention, the propylene-based polymer may be modified in the presence of a styrene-based compound.

Examples of the styrene-based compounds include styrene; α-methylstyrene; alkylstyrenes such as p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, and 3,5-dimethylstyrene; alkoxystyrenes such as p-methoxystyrene, o-methoxystyrene, and m-methoxystyrene; halogenated styrenes such as p-chlorostyrene, m-chlorostyrene, o-bromostyrene, p-fluorostyrene, m-fluorostyrene, o-fluorostyrene, and o-methyl-p-fluorostyrene; trimethylsilylstyrene; vinyl benzoate; divinylbenzene; etc.

These styrene-based compounds may be used alone or in combination of two or more.

The amount of the styrene-based compound is generally 0.1 to 10 parts by weight, preferably 0.1 to 5 parts by weight, per 100 parts by weight of the propylene-based polymer.

By using the styrene-based compound, the modification can be carried out more efficiently.

According to the invention, there are provided also the modified propylene homopolymer and the modified propylene copolymer, which are modified in the above manner.

The modified propylene homopolymer and the modified propylene copolymer of the invention can make a polyolefin, etc. more adhesive, stronger, or flexible, and they are useful as high-adhesive sealants, polyolefin modifiers for preparing a polyolefin with increased compatibility to an inorganic filler, etc.

The acid-modified content (the amount of components modified by the organic acid) is 0.001 to 50% by weight, preferably 0.01 to 40% by weight, more preferably 0.05 to 30% by weight.

When the acid-modified content is more than 50% by weight, the properties of the propylene-based polymer are likely to be remarkably deteriorated. When the acid-modified content is less than 0.001% by weight, the modified propylene-based polymer is likely to be poor in adhesion strength, dispersibility of an additive such as a filler, and coating properties.

The propylene-based polymer, which is used as a material and modified in the method of the invention, can be produced by homo- or co-polymerizing propylene in the presence of a metallocene catalyst.

The metallocene catalyst used in the invention is preferably a transition metal compound comprising ligands forming a cross-linked structure together with a cross-linking group. Particularly, propylene is more preferably homo- or co-polymerized by using a metallocene catalyst comprising a combination of a cocatalyst and a transition metal compound having a cross-linked structure with 2 cross-linking groups.

For example, the propylene may be homo- or co-polymerized in the presence of (A) a transition metal compound represented by the general formula (I):

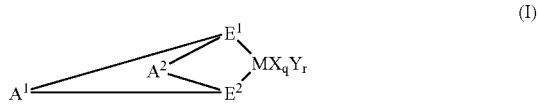

wherein M represents a metal atom of Groups 3 to 10 of the Periodic Table or the lanthanoid series; $E^1$ and $E^2$ represent the same or different ligands forming a cross-linked structure together with $A^1$ and $A^2$, selected from the group consisting of substituted cyclopentadienyl groups, indenyl groups, substituted indenyl groups, heterocyclopentadienyl groups, substituted heterocyclopentadienyl groups, amido groups, phosphide groups, hydrocarbon groups, and silicon-containing groups; X represents a σ-bonding ligand, the transition metal compound may have a plurality of the same or different X's, and X may be cross-linked with another X, $E^1$, $E^2$, or Y; Y represents a Lewis base, the transition metal compound may have a plurality of the same or different Y's, and Y may be cross-linked with another Y, $E^1$, $E^2$, or X; $A^1$ and $A^2$ are the same or different divalent cross-linking groups for linking the 2 ligands, and independently represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —$SO_2$—, —Se—, —$NR^1$—, —$PR^1$—, —$P(O)R^1$—, —$BR^1$—, or —$AlR^1$ —, in which $R^1$ represents a hydrogen atom, a halogen atom, a hydrocarbon group having 1 to 20 carbon atoms, or a halogen-containing hydrocarbon group having 1 to 20 carbon atoms; q represents an integer of 1 to 5 of [(valence of M)–2]; and r represents an integer of 0 to 3, and (B) a polymerization catalyst comprising a component selected from the group consisting of (B-1) a compound capable of reacting with the transition metal compound of (A) or a derivative thereof to form an ionic complex, and (B-2) an aluminoxane.

In the general formula (I), M represents a metal atom of Groups 3 to 10 of the Periodic Table or the lanthanoid series, and specific examples thereof include titanium, zirconium, hafnium, yttrium, vanadium, chromium, manganese, nickel, cobalt, palladium, lanthanoid metals, etc. Titanium, zirconium, and hafnium are preferred among the metal atoms in view of olefin polymerization activity, etc.

$E^1$ and $E^2$ independently represent a ligand selected from the group consisting of substituted cyclopentadienyl groups, indenyl groups, substituted indenyl groups, heterocyclopentadienyl groups, substituted heterocyclopentadienyl groups, amido groups (—N<), phosphide groups (—P<), hydrocarbon groups (>CR— and >C<), and silicon-containing groups (>SiR— and >Si<), in which R represents a hydrogen atom, a hydrocarbon group having 1 to 20 carbon atoms, or a heteroatom-containing group. $E^1$ and $E^2$ form a cross-linked structure together with $A^1$ and $A^2$.

$E^1$ and $E^2$ may be the same or different ligands.

$E^1$ and $E^2$ are preferably a substituted cyclopentadienyl group, an indenyl group, or a substituted indenyl group, respectively.

X represents a σ-bonding ligand. When the transition metal compound has a plurality of X's, the X's may be the same or different ligands. X may be cross-linked with another X, $E^1$, $E^2$, or Y.

Specific examples of X include halogen atoms, hydrocarbon groups having 1 to 20 carbon atoms, alkoxy groups having 1 to 20 carbon atoms, aryloxy groups having 6 to 20 carbon atoms, amido group having 1 to 20 carbon atoms, silicon-containing groups having 1 to 20 carbon atoms, phosphide groups having 1 to 20 carbon atoms, sulfide groups having 1 to 20 carbon atoms, acyl groups having 1 to 20 carbon atoms, etc.

Y represents a Lewis base. When the transition metal compound has a plurality of Y's, the Y's may be the same or different Lewis bases. Y may be cross-linked with another Y, $E^1$, $E^2$, or X.

Specific examples of the Lewis base Y include amines, ethers, phosphines, thioethers, etc.

$A^1$ and $A^2$ are the same or different divalent cross-linking groups for linking the 2 ligands, and independently represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —$SO_2$—, —Se—, —$NR^1$—, —$PR^1$—, —$P(O)R^1$—, —$BR^1$—, or —$AlR^1$—. $R^1$ represents a hydrogen atom, a halogen atom, a hydrocarbon group having 1 to 20 carbon atoms, or a halogen-containing hydrocarbon group having 1 to 20 carbon atoms.

It is preferred that at least one of the cross-linking groups comprises a hydrocarbon group having 1 or more carbon atoms.

Such a cross-linking group may be a group represented by the general formula:

wherein D represents a carbon atom, a silicon atom, or a tin atom, $R^2$ and $R^3$ independently represent a hydrogen atom or a hydrocarbon group having 1 to 20 carbon atoms, $R^2$ and $R^3$ may be the same or different and may be bonded together to form a ring structure, and e represents an integer of 1 to 4. Specific examples of the cross-linking groups include a methylene group, an ethylene group, an ethylidene group, a propylidene group, an isopropylidene group, a cyclohexylidene group, a 1,2-cyclohexylene group, a vinylidene group ($CH_2$=C=), a dimethylsilylene group, a diphenylsilylene group, a methylphenylsilylene group, a dimethylgermylene group, a dimethylstannylene group, a tetramethyldisilylene group, a diphenyldisilylene group, etc.

Preferred among these groups are an ethylene group, an isopropylidene group, and a dimethylsilylene group.

q represents an integer of 1 to 5 of [(valence of M)–2], and r represents an integer of 0 to 3.

In the transition metal compound represented by the general formula (I), when each of $E^1$ and $E^2$ is a substituted cyclopentadienyl group, an indenyl group, or a substituted indenyl group, the cross-linking groups $A^1$ and $A^2$ preferably form a (1,2') (2,1') double-cross-linked structure.

The compound represented by the general formula (I) is preferably a transition metal compound comprising ligands of double-cross-linking-type biscyclopentadienyl derivatives, represented by the general formula (II):

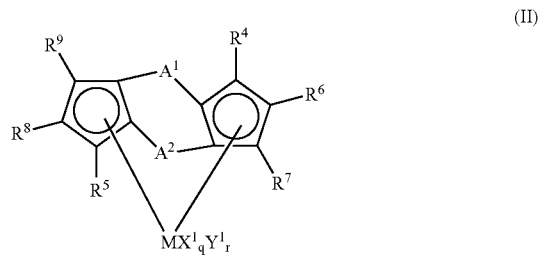

In the general formula (II), M, $A^1$, $A^2$, q, and r are the same as those described above.

$X^1$ represents a σ-bonding ligand. When the transition metal compound has a plurality of $X^1$'s, the $X^1$'s may be the same or different ligands. $X^1$ may be cross-linked with another $X^1$ or $H^1$.

Specific examples of $X^1$ may be the same as those of X in the general formula (I).

$Y^1$ represents a Lewis base. When the transition metal compound has a plurality of $Y^1$'s, the $Y^1$'s may be the same or different Lewis bases. $Y^1$ may be cross-linked with another $Y^1$ or $X^1$.

Specific examples of $Y^1$ may be the same as those of Y in the general formula (I).

$R^4$ to $R^9$ independently represent a hydrogen atom, a halogen atom, a hydrocarbon group having 1 to 20 carbon atoms, a halogen-containing hydrocarbon group having 1 to 20 carbon atoms, a silicon-containing group, or a heteroatom-containing group, and at least one of $R^9$ to $R^9$ is not a hydrogen atom.

$R^4$ to $R^9$ may be the same or different ones, and adjacent ones thereof may be bonded together to form a ring.

In the transition metal compound comprising the ligands of the double-cross-linking-type biscyclopentadienyl derivatives, the ligands preferably form a (1,2') (2,1') double-cross-linked structure.

Specific examples of the transition metal compounds represented by the general formula (I) include
(1,2'-ethylene)(2,1'-ethylene)-bis(indenyl)zirconium dichloride,
(1,2'-methylene)(2,1'-methylene)-bis(indenyl)zirconium dichloride,
(1,2'-isopropylidene)(2,1'-isopropylidene)-bis(indenyl)zirconium dichloride,
(1,2'-ethylene)(2,1'-ethylene)-bis (3-methylindenyl)zirconium dichloride,
(1,2'-ethylene)(2,1'-ethylene)-bis (4,5-benzoindenyl)zirconium dichloride,
(1,2'-ethylene)(2,1'-ethylene)-bis (4-isopropylindenyl)zirconium dichloride,
(1,2'-ethylene)(2,1'-ethylene)-bis (5,6-dimethylindenyl)zirconium dichloride,
(1,2'-ethylene)(2,1'-ethylene)-bis (4,7-diisopropylindenyl) zirconium dichloride,
(1,2'-ethylene)(2,1'-ethylene)-bis(4-phenylindenyl)zirconium dichloride,
(1,2'-ethylene)(2,1'-ethylene)-bis(3-methyl-4-isopropylindenyl)zirconium dichloride,
(1,2'-ethylene)(2,1'-ethylene)-bis(5,6-benzoindenyl)zirconium dichloride,
(1,2'-ethylene)(2,1'-isopropylidene)-bis(indenyl)zirconium dichloride,
(1,2'-methylene)(2,1'-ethylene)-bis(indenyl)zirconium dichloride,
(1,2'-methylene)(2,1'-isopropylidene)-bis(indenyl)zirconium dichloride,
(1,2'-dimethylsilylene)(2,1'-dimethylsilylene)-bis(indenyl) zirconium dichloride,
(1,2'-dimethylsilylene)(2,1'-dimethylsilylene)-bis(3-methylindenyl)zirconium dichloride,
(1,2'-dimethylsilylene)(2,1'-dimethylsilylene)-bis(3-n-butylindenyl)zirconium dichloride,
(1,2'-dimethylsilylene)(2,1'-dimethylsilylene)-bis(3-i-propylindenyl)zirconium dichloride,
(1,2'-dimethylsilylene)(2,1'-dimethylsilylene)-bis(3-trimethylsilylmethylindenyl)zirconium dichloride,
(1,2'-dimethylsilylene)(2,1'-dimethylsilylene)-bis(3-phenylindenyl)zirconium dichloride,
(1,2'-dimethylsilylene)(2,1'-dimethylsilylene)-bis(4,5-benzoindenyl)zirconium dichloride,
(1,2'-dimethylsilylene)(2,1'-dimethylsilylene)-bis(4-isopropylindenyl)zirconium dichloride,
(1,2'-dimethylsilylene)(2,1'-dimethylsilylene)-bis(5,6-dimethylindenyl)zirconium dichloride,
(1,2'-dimethylsilylene)(2,1'-dimethylsilylene)-bis(4,7-di-i-propylindenyl)zirconium dichloride,
(1,2'-dimethylsilylene)(2,1'-dimethylsilylene)-bis(4-phenylindenyl)zirconium dichloride,
(1,2'-dimethylsilylene)(2,1'-dimethylsilylene)-bis(3-methyl-4-i-propylindenyl)zirconium dichloride,
(1,2'-dimethylsilylene)(2,1'-dimethylsilylene)-bis(5,6-benzoindenyl)zirconium dichloride,
(1,2'-dimethylsilylene)(2,1'-isopropylidene)-bis(indenyl)zirconium dichloride,
(1,2'-dimethylsilylene)(2,1'-isopropylidene)-bis(3-methylindenyl)zirconium dichloride,
(1,2'-dimethylsilylene)(2,1'-isopropylidene)-bis(3-i-propylindenyl)zirconium dichloride,
(1,2'-dimethylsilylene)(2,1'-isopropylidene)-bis(3-n-butylindenyl)zirconium dichloride,
(1,2'-dimethylsilylene)(2,1'-isopropylidene)-bis(3-trimethylsilylmethylindenyl)zirconium dichloride,
(1,2'-dimethylsilylene)(2,1'-isopropylidene)-bis(3-trimethylsilylindenyl)zirconium dichloride,
(1,2'-dimethylsilylene)(2,1'-isopropylidene)-bis(3-phenylindenyl)zirconium dichloride,
(1,2'-dimethylsilylene)(2,1'-methylene)-bis(indenyl)zirconium dichloride,
(1,2'-dimethylsilylene)(2,1'-methylene)-bis(3-methylindenyl)zirconium dichloride,
(1,2'-dimethylsilylene)(2,1'-methylene)-bis(3-i-propylindenyl)zirconium dichloride,
(1,2'-dimethylsilylene)(2,1'-methylene)-bis(3-n-butylindenyl)zirconium dichloride,
(1,2'-dimethylsilylene)(2,1'-methylene)-bis(3-trimethylsilylmethylindenyl)zirconium dichloride,
(1,2'-dimethylsilylene)(2,1'-methylene)-bis(3-trimethylsilylindenyl)zirconium dichloride,
(1,2'-diphenylsilylene)(2,1'-methylene)-bis(indenyl)zirconium dichloride,
(1,2'-diphenylsilylene)(2,1'-methylene)-bis(3-methylindenyl)zirconium dichloride,
(1,2'-diphenylsilylene)(2,1'-methylene)-bis(3-i-propylindenyl)zirconium dichloride,
(1,2'-diphenylsilylene)(2,1'-methylene)-bis(3-n-butylindenyl)zirconium dichloride,
(1,2'-diphenylsilylene)(2,1'-methylene)-bis(3-trimethylsilylmethylindenyl)zirconium dichloride,
(1,2'-diphenylsilylene)(2,1'-methylene)-bis(3-trimethylsilylindenyl)zirconium dichloride,
(1,2'-dimethylsilylene)(2,1'-dimethylsilylene)(3-methylcyclopentadienyl)(3'-methylcyclopentadienyl)zirconium dichloride,
(1,2'-dimethylsilylene)(2,1'-isopropylidene)(3-methylcyclopentadienyl)(3'-methylcyclopentadienyl)zirconium dichloride,
(1,2'-dimethylsilylene)(2,1'-ethylene)(3-methylcyclopentadienyl)(3'-methylcyclopentadienyl)zirconium dichloride,
(1,2'-ethylene)(2,1'-methylene)(3-methylcyclopentadienyl)(3'-methylcyclopentadienyl)zirconium dichloride,
(1,2'-ethylene)(2,1'-isopropylidene)(3-methylcyclopentadienyl)(3'-methylcyclopentadienyl)zirconium dichloride,
(1,2'-methylene)(2,1'-methylene)(3-methylcyclopentadienyl)(3'-methylcyclopentadienyl)zirconium dichloride,
(1,2'-methylene)(2,1'-isopropylidene)(3-methylcyclopentadienyl)(3'-methylcyclopentadienyl)zirconium dichloride,
(1,2'-isopropylidene)(2,1'-isopropylidene)(3-methylcyclopentadienyl)(3'-methylcyclopentadienyl)zirconium dichloride, (1,2'-dimethylsilylene)(2,1'-dimethylsilylene)(3,4-dimethylcyclopentadienyl)(3',4'-dimethylcyclopentadienyl)zirconium dichloride,
(1,2'-dimethylsilylene)(2,1'-isopropylidene)(3,4-dimethylcyclopentadienyl)(3',4'-dimethylcyclopentadienyl)zirconium dichloride,
(1,2'-dimethylsilylene)(2,1'-ethylene)(3,4-dimethylcyclopentadienyl)(3',4'-dimethylcyclopentadienyl)zirconium dichloride,
(1,2'-ethylene)(2,1'-methylene)(3,4-dimethylcyclopentadienyl)(3',4'-dimethylcyclopentadienyl)zirconium dichloride,
(1,2'-ethylene)(2,1'-isopropylidene)(3,4-dimethylcyclopentadienyl)(3',4'-dimethylcyclopentadienyl)zirconium dichloride,
(1,2'-methylene)(2,1'-methylene)(3,4-dimethylcyclopentadienyl)(3',4'-dimethylcyclopentadienyl)zirconium dichloride,
(1,2'-methylene)(2,1'-isopropylidene)(3,4-dimethylcyclopentadienyl)(3',4'-dimethylcyclopentadienyl)zirconium dichloride,
(1,2'-isopropylidene)(2,1'-isopropylidene)(3,4-dimethylcyclopentadienyl)(3',4'-dimethylcyclopentadienyl)zirconium dichloride,
(1,2'-dimethylsilylene)(2,1'-dimethylsilylene)(3-methyl-5-ethylcyclopentadienyl)(3'-methyl-5'-ethylcyclopentadienyl)zirconium dichloride,
(1,2'-dimethylsilylene)(2,1'-dimethylsilylene)(3-methyl-5-ethylcyclopentadienyl)(3'-methyl-5'-ethylcyclopentadienyl)zirconium dichloride,
(1,2'-dimethylsilylene)(2,1'-dimethylsilylene)(3-methyl-5-isopropylcyclopentadienyl)(3'-methyl-5'-isopropylcyclopentadienyl)zirconium dichloride,
(1,2'-dimethylsilylene)(2,1'-dimethylsilylene)(3-methyl-5-n-butylcyclopentadienyl)(3'-methyl-5'-n-butylcyclopentadienyl)zirconium dichloride,
(1,2'-dimethylsilylene)(2,1'-dimethylsilylene)(3-methyl-5-phenylcyclopentadienyl)(3'-methyl-5'-phenylcyclopentadienyl)zirconium dichloride,
(1,2'-dimethylsilylene)(2,1'-isopropylidene)(3-methyl-5-ethylcyclopentadienyl)(3'-methyl-5'-ethylcyclopentadienyl)zirconium dichloride,
(1,2'-dimethylsilylene)(2,1'-isopropylidene)(3-methyl-5-i-propylcyclopentadienyl)(3'-methyl-5'-i-propylcyclopentadienyl)zirconium dichloride,
(1,2'-dimethylsilylene)(2,1'-isopropylidene)(3-methyl-5-n-butylcyclopentadienyl)(3'-methyl-5'-n-butylcyclopentadienyl)zirconium dichloride,
(1,2'-dimethylsilylene)(2,1'-isopropylidene)(3-methyl-5-phenylcyclopentadienyl)(3'-methyl-5'-phenylcyclopentadienyl)zirconium dichloride,
(1,2'-dimethylsilylene)(2,1'-ethylene)(3-methyl-5-ethylcyclopentadienyl)(3'-methyl-5'-ethylcyclopentadienyl)zirconium dichloride,
(1,2'-dimethylsilylene)(2,1'-ethylene)(3-methyl-5-i-propylcyclopentadienyl)(3'-methyl-5'-i-propylcyclopentadienyl)zirconium dichloride,
(1,2'-dimethylsilylene)(2,1'-ethylene)(3-methyl-5-n-butyl cyclopentadienyl)(3'-methyl-5'-n-butylcyclopentadienyl)zirconium dichloride,
(1,2'-dimethylsilylene)(2,1'-ethylene)(3-methyl-5-phenylcyclopentadienyl)(3'-methyl-5'-phenylcyclopentadienyl)zirconium dichloride,
(1,2'-dimethylsilylene)(2,1'-methylene)(3-methyl-5-ethylcyclopentadienyl)(3'-methyl-5'-ethylcyclopentadienyl)zirconium dichloride,
(1,2'-dimethylsilylene)(2,1'-methylene)(3-methyl-5-i-propylcyclopentadienyl)(3'-methyl-5'-i-propylcyclopentadienyl)zirconium dichloride,
(1,2'-dimethylsilylene)(2,1'-methylene)(3-methyl-5-n-butylcyclopentadienyl)(3'-methyl-5'-n-butylcyclopentadienyl)zirconium dichloride,
(1,2'-dimethylsilylene)(2,1'-methylene)(3-methyl-5-phenylcyclopentadienyl)(3'-methyl-5'-phenylcyclopentadienyl)zirconium dichloride,
(1,2'-ethylene)(2,1'-methylene)(3-methyl-5-i-propylcyclopentadienyl)(3'-methyl-5'-i-propylcyclopentadienyl)zirconium dichloride,
(1,2'-ethylene)(2,1'-isopropylidene)(3-methyl-5-i-propylcyclopentadienyl)(3'-methyl-5'-i-propylcyclopentadienyl)zirconium dichloride,
(1,2'-methylene)(2,1'-methylene)(3-methyl-5-i-propylcyclopentadienyl)(3'-methyl-5'-i-propylcyclopentadienyl)zirconium dichloride,
(1,2'-methylene)(2,1'-isopropylidene)(3-methyl-5-i-propylcyclopentadienyl)(3'-methyl-5'-i-propylcyclopentadienyl)zirconium dichloride, and compounds provided by replacing zirconium thereof with titanium or hafnium.

The transition metal compound is not limited thereto.

Further, compounds similar thereto comprising a metal atom of the other Group or the lanthanoid series may be used in the invention.

The compound (B-1) of the polymerization catalyst (B) can be reacted with the transition metal compound of (A) to form an ionic complex, and is preferably represented by the following general formula (III) or (IV):

wherein $L^2$ is $M^2$, $R^{11}R^{12}M^3$, $R^{13}{}_3C$, or $R^{14}M^3$.

In the general formulae (III) and (IV), $L^1$ represents a Lewis base. $[Z]^-$ represents a non-coordinating anion $[Z^1]^-$ or $[Z^2]^-$. $[Z^1]^-$ represents an anion $[M^1G^1G^2 \ldots G^f]^-$ comprising an element and a plurality of groups bonded thereto, in which $M^1$ represents an element of Groups 5 to 15 of the Periodic Table, preferably an element of Groups 13 to 15 of the Periodic Table, $G^1$ to $G^f$ independently represent a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organometalloid group, or a heteroatom-containing hydrocarbon group having 2 to 20 carbon atoms, two or more of $G^1$ to $G^f$ may form a ring, and f represents an integer of [(valence of central metal $M^1$)+1]. $[Z^2]^-$ represents a conjugate base of a Broensted acid having a logarithm of reciprocal of acid dissociation constant (pKa) of −10 or less, a conjugate base of a combination of a Broensted acid and a Lewis acid, or a conjugate base of a so-called super acid. $[Z^2]^-$ may be coordinated with a Lewis base. $R^{10}$ represents a hydrogen atom, an alkyl group having 1 to 20 carbon atoms, an aryl group having 6 to 20 carbon atoms, an alkylaryl group, or an arylalkyl group, $R^{11}$ and $R^{12}$ independently represent a cyclopentadienyl group, a substituted cyclopentadienyl group, an indenyl group, or a fluorenyl group, $R^{13}$ represents an alkyl group having 1 to 20 carbon atoms, an aryl group, an alkylaryl group, or an arylalkyl group, and $R^{14}$ represents a macrocyclic ligand such as tetraphenylporphyrin and phthalocyanine. k represents an integer of 1 to 3, which is an ionic valence of [L¹-R¹⁰] and [L²]. a represents an integer of 1 or more, and b is a value of (k×a). M² comprises an element of Groups 1 to 3, 11 to 13, and 17 of the Periodic Table, and M³ represents an element of Groups 7 to 12 of the Periodic Table.

Specific examples of L¹ include amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, and p-nitro-N,N-dimethylaniline; phosphines such as triethylphosphine, triphenylphosphine, and diphenylphosphine; thioethers such as tetrahydrothiophene; esters such as ethyl benzoate; nitriles such as acetonitrile and benzonitrile; etc.

Specific examples of R¹⁰ include a hydrogen atom, a methyl group, an ethyl group, a benzyl group, a trityl group, etc. Specific examples of R¹¹ and R¹² include a cyclopentadienyl group, a methylcyclopentadienyl group, an ethylcyclopentadienyl group, a pentamethylcyclopentadienyl group, etc.

Specific examples of R¹³ include a phenyl group, a p-tolyl group, a p-methoxyphenyl group, etc., and specific examples of R¹⁴ include tetraphenylporphyrin, phthalocyanine, an allyl group, a methallyl group, etc.

Specific examples of M² include Li, Na, K, Ag, Cu, Br, I, I₃, etc., and specific examples of M³ include Mn, Fe, Co, Ni, Zn, etc.

In [M¹G¹G² ... G^f]⁻ of [Z¹]⁻, specific examples of M¹ include B, Al, Si, P, As, Sb, etc. M¹ is preferably B or Al.

Specific examples of G¹, G² to G^f include dialkylamino groups such as a dimethylamino group and a diethylamino group; alkoxy or aryloxy groups such as a methoxy group, an ethoxy group, a n-butoxy group, and a phenoxy group; hydrocarbon groups such as a methyl group, an ethyl group, a n-propyl group, an isopropyl group, a n-butyl group, an isobutyl group, a n-octyl group, a n-eicosyl group, a phenyl group, a p-tolyl group, a benzyl group, a 4-t-butylphenyl group, and a 3,5-dimethylphenyl group; halogen atoms such as a fluorine atom, a chlorine atom, a bromine atom, and an iodine atom; heteroatom-containing hydrocarbon groups such as a p-fluorophenyl group, a 3,5-difluorophenyl group, a pentachlorophenyl group, a 3,4,5-trifluorophenyl group, a pentafluorophenyl group, a 3,5-bis(trifluoromethyl)phenyl group, and a bis(trimethylsilyl)methyl group; organometalloid groups such as a pentamethylantimony group, a trimethylsilyl group, a trimethylgermyl group, a diphenylarsine group, a dicyclohexyl antimony group, and diphenylboron group; etc.

Specific examples of the non-coordinating anion [Z²]⁻, the conjugate base of a Broensted acid having pKa of −10 or less or a combination of a Broensted acid and a Lewis acid, include trifluoromethanesulfonic acid anion (CF₃SO₃)⁻, bis(trifluoromethanesulfonyl)methyl anion, bis(trifluoromethanesulfonyl)benzyl anion, bis(trifluoromethanesulfonyl)amide, perchloric acid anion (ClO₄)⁻, trifluoroacetic acid anion (CF₃CO₂)⁻, hexafluoroantimony anion (SbF₆)⁻, fluorosulfonic acid anion (FSO₃)⁻, chlorosulfonic acid anion (ClSO₃)⁻, fluorosulfonic acid anion/antimony pentafluoride (FSO₃/SbF₅)⁻, fluorosulfonic acid anion/arsenic pentafluoride (FSO₃/AsF₅)⁻, trifluoromethanesulfonic acid anion/antimony pentafluoride (CF₃SO₃/SbF₅)⁻, etc.

Specific examples of the ionic compounds of (B-1) capable of reacting with the transition metal compound of (A) to form an ionic complex include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium)tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl)ammonium tetrakis(pentafluorophenyl)borate, methyldiphenylammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl (2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-di-trifluoromethyl) phenyl]borate, ferrocenium tetraphenylborate, silver tetraphenylborate, trityl tetraphenylborate, tetraphenylporphyrin manganese tetraphenylborate, ferrocenium tetrakis(pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis (pentafluorophenyl)borate, tetraphenylporphyrin manganese tetrakis(pentafluorophenyl)borate, silver tetrafluoroborate, silver hexafluorophosphate, silver hexafluoroarsenate, silver perchlorate, silver trifluoroacetate, silver trifluoromethanesulfonate, etc.

The compounds of (B-1), which can be reacted with the transition metal compound of (A) to form an ionic complex, may be used alone or in combination of two or more.

The aluminoxane of (B-2) may be a linear aluminoxane represented by the general formula (V):

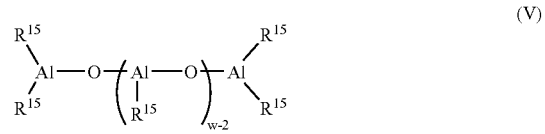

(V)

wherein R¹⁵'s independently represent a hydrocarbon group such as an alkyl group, an alkenyl group, an aryl group, and an arylalkyl group, which has 1 to 20 carbon atoms and preferably has 1 to 12 carbon atoms, or a halogen atom, w represents an average polymerization degree, which is generally an integer of 2 to 50, preferably an integer of 2 to 40, and R¹⁵'s may be the same or different ones, or a cyclic aluminoxane represented by the general formula (VI):

(VI)

wherein $R^{15}$ and w are the same as those in the general formula (V).

The aluminoxane may be produced by bringing an alkyl aluminum into contact with a condensing agent such as water. The aluminoxane may be produced by a known method without particular limitations.

For example, the aluminoxane may be produced by (1) a method of dissolving an organoaluminum compound in an organic solvent and contacting the resultant solution with water; (2) a method of adding an organoaluminum compound before the polymerization and then adding water; (3) a method of reacting an organoaluminum compound with crystal water of a metal salt, etc. or adsorbed water of an inorganic or organic compound; (4) a method of reacting trialkylaluminum with tetraalkyldialuminoxane and then with water; etc.

The aluminoxane may be insoluble in toluene.

These aluminoxanes may be used alone or in combination of two or more.

In the case of using the compound (B-1) as the catalyst component (B), the mole ratio of the catalyst component (A) to the catalyst component (B) is preferably 10/1 to 1/100, more preferably 2/1 to 1/10. When the mole ratio is without the range, the catalyst cost per unit weight of the polymer is increased to be not practical.

In the case of using the compound (B-2), the mole ratio of the catalyst component (A) to the catalyst component (B) is preferably 1/1 to 1/1,000,000, more preferably 1/10 to 1/10,000.

When the mole ratio is without the range, the catalyst cost per unit weight of the polymer is increased to be not practical.

The compounds (B-1) and the compounds (B-2) may be used as the catalyst component (B) alone or in combination of two or more.

The polymerization catalyst used for producing the propylene-based polymer in the invention may contain an organoaluminum compound as a component (C) in addition to the components (A) and (B).

The organoaluminum compound of the component (C) may be a compound represented by the general formula (VII):

(VII)

wherein $R^{16}$ represents an alkyl group having 1 to 10 carbon atoms, J represents a hydrogen atom, an alkoxy group having 1 to 20 carbon atoms, an aryl group having 6 to 20 carbon atoms, or a halogen atom, and v represents an integer of 1 to 3.

Specific examples of the compounds represented by the general formula (VII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, ethylaluminum sesquichloride, etc.

These organoaluminum compounds may be used alone or in combination of two or more.

In the production of the propylene-based polymer used in the invention, the components (A), (B) and (C) may be subjected to preliminary contact.

For example, the preliminary contact may be carried out such that the component (B) is brought into contact with the component (A). There are no particular limitations in the preliminary contact, and known preliminary contact methods may be used in the invention.

The preliminary contact is effective for increasing the catalytic activity, reducing the amount of the cocatalyst of (B), etc., thereby reducing the catalyst costs.

Further, in addition to the above effects, the preliminary contact of the components (A) and (B-2) is effective for increasing the molecular weight of the product.

The temperature for the preliminary contact is generally −20 to 200° C., preferably −10 to 150° C., more preferably 0 to 80° C.

In the preliminary contact, an inert hydrocarbon such as an aliphatic hydrocarbon and an aromatic hydrocarbon may be used in a solvent.

The inert hydrocarbon is particularly preferably an aliphatic hydrocarbon.

The mole ratio of the catalyst component (A) to the catalyst component (C) is preferably 1/1 to 1/10,000, more preferably 1/5 to 1/2,000, further preferably 1/10 to 1/1,000.

The polymerization activity per the transition metal can be increased by using the catalyst component (C). However, in the case of using an excessively large amount of the organoaluminum compound, part of the organoaluminum compound is wasted, and a large amount of the compound disadvantageously remains in the polymer.

In the invention, at least one of the catalyst components may be supported on a suitable carrier.

The type of the carrier is not particularly limited, and the carrier may be an inorganic oxide carrier, other inorganic carrier, or an organic carrier. The carrier is particularly preferably an inorganic oxide carrier or the other inorganic carrier.

Specific examples of the inorganic oxide carriers include $SiO_2$, $Al_2O_3$, $MgO$, $ZrO_2$, $TiO_2$, $Fe_2O_3$, $B_2O_3$, $CaO$, $ZnO$, $BaO$, $ThO_2$, mixtures thereof such as silica alumina, zeolite, ferrite, and glass fibers, etc.

Among these inorganic oxide carriers, $SiO_2$ and $Al_2O_3$ are particularly preferred.

The inorganic oxide carrier may contain a small amount of carbonates, nitrates, sulfates, etc.

The other inorganic carrier may be a magnesium compound such as $MgCl_2$ and $Mg(OC_2H_5)_2$ represented by the general formula $MgR^{17}_xX^1_y$, or a complex salt thereof, etc.

$R^{17}$ represents an alkyl group having 1 to 20 carbon atoms, an alkoxy group having 1 to 20 carbon atoms, or an aryl group having 6 to 20 carbon atoms, $X^1$ represents a halogen atom or an alkyl group having 1 to 20 carbon atoms, x is 0 to 2, y is 0 to 2, and the sum of x and y is 2.

When the magnesium compound has a plurality of $R^{17}$'s or $X^1$'s, they may be the same or different ones.

Examples of the organic carriers include polymers such as polystyrenes, styrene-divinylbenzene copolymers, polyethylenes, polypropylenes, substituted polystyrenes, and polyarylates; starchs; carbons; etc.

Preferred carriers for the invention include $MgCl_2$, $MgCl(OC_2H_5)$, $Mg(OC_2H_5)_2$, etc.

The average particle diameter of the carrier is generally 1 to 300 μm, preferably 10 to 200 μm, more preferably 20 to 100 μm, though depending on the type and the production method thereof.

When the particle diameter is too small, the polymer disadvantageously contains a larger amount of finer powder. When the particle diameter is too large, coarse particles are increased in the polymer to reduce the bulk density and clog a hopper.

The specific surface area of the carrier is generally 1 to 1000 m²/g, preferably 50 to 500 m²/g. The pore volume of the carrier is generally 0.1 to 5 cm³/g, preferably 0.3 to 3 cm³/g.

When the specific surface area or the pore volume is without the above range, the catalytic activity is often lowered.

The specific surface area and the pore volume may be obtained, for example, from a volume of nitrogen gas absorbed according to a BET method (see, *J. Am. Chem. Soc.*, 60, 309 (1983)).

The inorganic oxide carrier is preferably calcined. The calcination temperature is generally 150 to 1,000° C., preferably 200 to 800° C.

In the case of using the carrier, it is preferred that one of the catalyst components (A) and (B) is supported on the carrier, and it is more preferred that both of the catalyst components (A) and (B) are supported.

The method for supporting at least one of the components (A) and (B) is not particularly limited, and examples of the method include (1) a method of mixing at least one of the components (A) and (B) with the carrier; (2) a method of treating the carrier with an organoaluminum compound or a halogen-containing silicon compound, and mixing the carrier with at least one of the components (A) and (B) in an inert solvent; (3) a method of reacting the carrier with the component (A) and/or the component (B), and with an organoaluminum compound or a halogen-containing silicon compound; (4) a method of supporting the component (A) or (B) on the carrier and then mixing the carrier with the component (B) or (A); (5) a method of mixing a contact reaction product of the components (A) and (B) with the carrier; (6) a method of carrying out a contact reaction of the components (A) and (B) in the presence of the carrier; etc.

The methods of (4), (5) and (6) may be carried out in the presence of the organoaluminum compound (C).

In the invention, the catalyst may be prepared by irradiating the components (A), (B) and (C) with an elastic wave during the contact treatment.

The elastic wave is generally a sound wave, particularly preferably an ultrasonic wave.

Specifically, the elastic wave may be an ultrasonic wave having a frequency of 1 to 1,000 kHz, preferably an ultrasonic wave having a frequency of 10 to 500 kHz.

Thus-obtained catalyst may be used in the polymerization in the solid state after distilling off the solvent or in the state of the reaction liquid.

In the invention, at least one of the components (A) and (B) may be supported on the carrier to prepare the catalyst in the polymerization system.

For example, catalyst particles may be prepared by the steps of adding at least one of the components (A) and (B) and the carrier, adding the component (C) of the organoaluminum compound thereto if necessary, adding an olefin such as ethylene to the resulting mixture into the ordinary pressure to 20 kg/cm$^2$, and pre-polymerizing the olefin at −20 to 200° C. for 1 minute to 2 hours.

The weight ratio of the component (B-1) to the carrier is preferably 1/5 to 1/10,000, more preferably 1/10 to 1/500. The weight ratio of the component (B-2) to the carrier is preferably 1/0.5 to 1/1,000, more preferably 1/1 to 1/50.

In the case of using two or more types of the components (B), the weight ratio of each component (B) to the carrier is preferably within the above range.

The weight ratio of the component (A) to the carrier is preferably 1/5 to 1/10,000, more preferably 1/10 to 1/500.

When the weight ratio of the component (B) (the component (B-1) or the component (B-2)) or the weight ratio of the component (A) to the carrier is without the above range, the catalytic activity is lowered in some cases.

The average particle diameter of the polymerization catalyst thus prepared is generally 2 to 200 μm, preferably 10 to 150 μm, particularly 20 to 100 μm. The specific surface area of the catalyst is generally 20 to 1,000 m$^2$/g, preferably 50 to 500 m$^2$/g.

When the average particle diameter is less than 2 μm, the fine powder content of the polymer is often increased. When the average particle diameter is more than 200 μm, the coarse particle content of the polymer is increased.

When the specific surface area is less than 20 m$^2$/g, the catalytic activity tends to be lowered. When the specific surface area is more than 1,000 m$^2$/g, the bulk density of the polymer is reduced in some cases.

In the catalyst used in the invention, the amount of the transition metal per 100 g of the carrier is generally 0.05 to 10 g, particularly preferably 0.1 to 2 g.

When the amount of the transition metal is without the above range, the catalytic activity tends to be lowered.

By using the carrier for supporting the catalyst component, an industrially useful polymer having a high bulk density and an excellent particle size distribution can be produced.

The propylene-based polymer used in the invention may be produced by homo- or co-polymerizing propylene in the presence of the polymerization catalyst.

In this case, the method for the polymerization is not particularly limited, and may be a slurry polymerization method, a gas phase polymerization method, a bulk polymerization method, a solution polymerization method, or a suspension polymerization method, etc. Particularly preferred methods are the solution polymerization method and the bulk polymerization method.

The polymerization temperature is generally −100 to 250° C., preferably −50 to 200° C., more preferably 0 to 130° C.

The amount of the catalyst and the starting material is such that the mole ratio of the monomer/the component (A) is preferably 1 to 10$^8$, particularly 100 to 10$^5$.

The polymerization time is generally 5 minutes to 10 hours, and the polymerization pressure is preferably ordinary pressure to 20 MPa (G), particularly preferably ordinary pressure to 10 MPa (G).

The molecular weight of the polymer may be controlled by selecting the type and amount of each catalyst component, by selecting the polymerization temperature, or by carrying out the polymerization in the presence of hydrogen.

In the case of using a solvent in the polymerization system, the solvent may be an aromatic hydrocarbon such as benzene, toluene, xylene, and ethylbenzene; an alicyclic hydrocarbon such as cyclopentane, cyclohexane, and methylcyclohexene; an aliphatic hydrocarbon such as pentane, hexane, heptane, and octane; a halogenated hydrocarbon such as chloroform and dichloromethane; etc.

These solvents may be used alone or in combination of two or more.

Further, a monomer such as an α-olefin may be used as the solvent.

The polymerization can be carried out without the solvent in some polymerization methods.

According to the invention, there are also provided the adhesive compositions containing the modified polypropylene-based polymers.

Thus, by adding an appropriate additive to the modified polypropylene-based polymer of the invention, the polymer can be used in hot-melt adhesive compositions.

The additive may be a tackifying resin, and examples thereof include rosin resins prepared from crude turpentine; terpene resins prepared from α- or β-pinene obtained from essential pine oil; petroleum resins prepared by polymerizing a fraction containing a unsaturated hydrocarbon, which is generated as a by-product in thermal decomposition of petroleum naphtha, etc.; and hydrogenated derivatives thereof.

Specific examples of the tackifying resins include IMARV P-125, IMARV P-100, and IMARV P-90 available from Idemitsu Petrochemical Co., Ltd.; HI-REZ T1115 available from Mitsui Chemicals, Inc.; CLEARON K100 available from Yasuhara Chemical Co., Ltd.; ESCOREZ 5300 and ESCOREZ 2101 available from Exxon Chemical Company; ARKON P100 available from Arakawa Chemical Industries, Ltd.; REGALREZ 1078 available from Hercules, Inc.; etc.

In the invention, the hydrogenated derivatives are preferred from the viewpoint of compatibility to the base polymer.

The tackifying resin is more preferably a hydrogenated derivative of the petroleum resin excellent in thermal stability.

Various additives such as a plasticizer, an inorganic filler, and an antioxidant may be added to the adhesive composition of the invention if necessary.

Examples of the plasticizers include paraffin-based process oil, polyolefin wax, phthalic esters, adipic esters, fatty acid esters, glycol compounds, epoxy-based polymer plasticizers, naphthene oil, etc.

Examples of the inorganic fillers include clay, talc, calcium carbonate, barium carbonate, etc.

Examples of the antioxidants include phosphorus-based antioxidants such as tris(nonylphenyl) phosphite, distearylpentaerythritol diphosphite, ADEKASTAB 1178 available from Asahi Denka Kogyo K.K., SUMIRISER TNP available from Sumitomo Chemical Co. Ltd., IRGAPHOS 168 available from Ciba Specialty Chemicals Co., and SANDSTAB P-EPQ available from Sandoz; phenol-based antioxidants such as 2,6-di-t-butyl-4-methyl-phenol, n-octadecyl-3-(3',5'-di-t-butyl-4'-hydroxyphenyl)propionate, SUMIRISER BHT available from Sumitomo Chemical Co. Ltd., and IRGANOX 1010 available from Ciba Specialty Chemicals Co.; sulfur-based antioxidants such as dilauryl 3,3'-thiodipropionate, pentaerythritol tetrakis (3-laurylthiopropionate), SUMIRISER TPL available from Sumitomo Chemical Co. Ltd., YOSHINOX DLTP available from Yoshitomi Pharmaceutical Industries, Ltd., and ANTIOX L available from NOF Corporation; etc.

The hot-melt adhesive composition of the invention may comprise 20 to 99% by weight of the modified propylene-based polymer and 1 to 80% by weight of the tackifying resin.

The adhesive composition preferably comprises 25 to 95% by weight of the modified propylene-based polymer and 75 to 5% by weight of the tackifying resin.

The adhesive composition more preferably comprises 30 to 85% by weight of the modified propylene-based polymer and 70 to 15% by weight of the tackifying resin.

The adhesive composition particularly preferably comprises 35 to 75% by weight of the modified propylene-based polymer and 65 to 25% by weight of the tackifying resin.

(Method for Producing Hot-melt Adhesive Composition)

The hot-melt adhesive composition of the invention may be prepared such that 20 to 99% by weight of the modified propylene-based polymer, 1 to 80% by weight of the tackifying resin, and an optional additive are dry-blended by a Henschel mixer, etc. and melt-mixed by a single- or twin-screw extruder, a plastomill, a Banbury mixer, etc.

The optional additive, which is added if necessary, may be the plasticizer, the inorganic filler, or the antioxidant described above, etc.

EXAMPLES

The present invention will be described in more detail below with reference to Examples without intention of restricting the scope of the invention.

Production Example 1

Production of Propylene Homopolymer (1) Synthesis of Complex: Synthesis of (1,2'-dimethylsilylene)(2,1'-dimethylsilylene)-bis(3-trimethylsilylmethylindenyl)zirconium dichloride In a Schlenk bottle, 3.0 g (6.97 mmol) of a lithium salt of (1,2'-dimethylsilylene)(2,1'-dimethylsilylene)-bis(indene) was dissolved in 50 mL of tetrahydrofuran (THF) and cooled to −78° C. 2.1 mL (14.2 mmol) of iodomethyltrimethylsilane was slowly added dropwise to the cooled liquid, and stirred at the room temperature for 12 hours.

Then, the solvent was distilled off, and washed with a saturated ammonium chloride solution after adding 50 mL of ether.

After the water phase was separated, the organic phase was dried, thereby obtaining 3.04 g (5.88 mmol) of (1,2'-dimethylsilylene)(2,1'-dimethylsilylene)-bis(3-trimethylsilylmethylindene) (84% yield).

Next, 3.04 g (5.88 mmol) of the above (1,2'-dimethylsilylene)(2,1'-dimethylsilylene)-bis(3-trimethylsilylmethylindene) and 50 mL of ether were added to a schlenk bottle under a nitrogen gas stream.

The mixture was cooled to −78° C., and 7.6 mL (11.7 mmol) of an n-BuLi hexane solution (1.54 mol/L) was added to the mixture and stirred at the room temperature for 12 hours.

The solvent was distilled off, and the resultant solid was washed with 40 mL of hexane, to obtain 3.06 g (5.07 mmol) of a lithium salt as an ether adduct (73% yield).

The results of $^1$H-NMR measurement (90 MHz, THF-$d_8$) of the product were as follows: δ 0.04 (s, 18H, trimethylsilyl), 0.48 (s, 12H, dimethylsilylene), 1.10 (t, 6H, methyl), 2.59 (s, 4H, methylene), 3.38 (q, 4H, methylene), 6.2-7.7 (m, 8H, Ar—H).

The obtained lithium salt was dissolved in 50 mL of toluene under a nitrogen gas stream, and cooled to −78° C. To this was added dropwise a suspension of 1.2 g (5.1 mmol) of zirconium tetrachloride and 20 mL of toluene, which was cooled to −78° C. beforehand.

After the addition, the resulting liquid was stirred at the room temperature for 6 hours, and then the solvent of the liquid was distilled off.

The residue was subjected to recrystallization from dichloromethane to obtain 0.9 g (1.33 mmol) of (1,2'-dimethylsilylene)(2,1'-dimethylsilylene)-bis(3-trimethylsilylmethylindenyl)zirconium dichloride (26% yield).

The results of $^1$H-NMR measurement (90 MHz, CDCl$_3$) of the product were as follows: δ 0.0 (s, 18H, trimethylsilyl), 1.02, 1.12 (s, 12H, dimethylsilylene), 2.51 (dd, 4H, methylene), 7.1-7.6 (m, 8H, Ar—H).

(2) Polymerization of Propylene

A 10L stainless steel autoclave was dried by heating, and thereto was added 5 L of heptane, 5 mmol of triisobutylaluminum, 10 μmol of methylanilinium tetrakis(perfluorophenyl)borate, and 5 μmol of the transition metal complex prepared in (1) of (1,2'-dimethylsilylene)(2,1'-dimethylsilylene)-bis(3-trimethylsilylmethylindenyl) zirconium dichloride.

Then, hydrogen was introduced into the autoclave into the pressure of 0.03 MPa, the resultant mixture was heated to 80° C. while stirring, and propylene gas was introduced into the autoclave to increase the total pressure to 0.8 MPa.

The polymerization of propylene was carried out for 20 minutes while the constant inner pressure was maintained by supplying propylene gas to the autoclave by a pressure regulator. After the polymerization, the resultant contents were taken out of the autoclave and vacuum-dried to obtain 1,500 g of a polypropylene.

Production Example 2

The polymerization of propylene was carried out in the same manner as (2) Polymerization of propylene of Production Example 1 except that 2.5 mL of a 2 mol/L toluene slurry of methylaluminoxane (MAO, available from Albemarle Corporation) was used instead of 10 μmol of methylanilinium tetrakis(perfluorophenyl)borate, the polymerization temperature was 60° C., the polymerization time was 60 minutes, and the hydrogen pressure was 0.03 MPa.

After the polymerization, the resultant contents were taken out of the autoclave and vacuum-dried to obtain 1,200 g of a polypropylene.

Production Example 3

The polymerization of propylene was carried out in the same manner as (2) Polymerization of propylene of Production Example 1 except that the hydrogen pressure was 0.05 MPa.

After the polymerization, the resultant contents were taken out of the autoclave and vacuum-dried to obtain a polypropylene.

Production Example 4

The polymerization of propylene was carried out in the same manner as Production Example 2 except that the hydrogen pressure was 0.6 MPa.

After the polymerization, the resultant contents were taken out of the autoclave and vacuum-dried to obtain a polypropylene.

The resin properties of the propylene homopolymers produced in Production Examples 1 to 4 were evaluated. The results are shown in Table 1.

TABLE 1

Results of evaluation of propylene homopolymers

| | Production Example 1 | Production Example 2 | Production Example 3 | Production Example 4 |
|---|---|---|---|---|
| limiting viscosity [η], dL/g | 0.43 | 1.9 | 0.39 | 0.17 |
| mmmm fraction, mol % | 42 | 46 | 45 | 44 |
| abnormal insertion fraction (2.1-insertion/ 1.3-insertion) | 0/0 | 0/0 | 0/0 | 0/0 |
| rrrr/(1-mmmm), mol % | 0.04 | 0.04 | 0.04 | 0.04 |
| molecular weight distribution (Mw/Mn) | 2.2 | 2.1 | 2.0 | 2.0 |
| rmrm fraction, mol % | 3.0 | 2.9 | 3.0 | 3.0 |
| rmrr/(mr)$^2$ | 1.2 | 1.3 | 1.2 | 1.3 |
| melting endotherm (ΔH), J/mol | n.d. | n.d. | n.d. | n.d. |
| weight ratio of eluted components (W25), Wt % | 92 | 90 | 93 | 94 | n.d.: Not determined.

Example 1

Modification of Propylene Homopolymer 5.0 g the propylene homopolymer produced in Production Example 1 and 300 mL of trichlorobenzene were introduced into a 1L short-neck flask equipped with a dimroth bottle, and stirred at 120° C. for 1 hour.

Then, 0.01 g of an organic peroxide of 2,5-dimethyl-2,5-di(t-butylperoxy)hexyne-3 (PERHEXYNE 25B available from NOF Corporation) and 0.1 g of maleic anhydride were introduced into the flask, and heated and stirred at 180° C. for 30 minutes.

After the heating, the resultant mixture was left and cooled to the room temperature, and added to 2 L of methanol. The generated precipitates were isolated by filtration and dried to obtain a modified propylene homopolymer.

Example 2

Production of Modified Propylene Homopolymer Pellet

A block of the propylene homopolymer produced in Production Example 2 was cut into the size of 5 mm×5 mm or less by scissors. 500 g of this propylene homopolymer was well-mixed with 1.5 g of maleic anhydride and 0.1 g of an organic peroxide of 2,5-dimethyl-2,5-di(t-butylperoxy)hexyne-3 (PERHEXYNE 25B available from NOF Corporation) at the room temperature, and converted to a polypropylene pellet by using a twin-screw extruder (LABO PLASTOMILL 2D25W available from Toyo Seiki Seisaku-Sho, Ltd.) at the resin temperature of 180° C.

Example 3

Production of Modified Propylene Homopolymer Pellet

A polypropylene pellet was prepared in the same manner as Example 2 except that the amount of maleic anhydride was 5 g, the amount of PERHEXYNE 25B was 0.2 g, and 5 g of styrene was added.

Example 4

2 kg of the propylene homopolymer produced in Production Example 2 was melt-mixed with a blend of 40 g of maleic anhydride and 8 g of α,α'-bis(t-butylperoxy)diisopropylbenzene (PERBUTYL P available from NOF Corporation) by using a 20 mm twin-screw extruder (LABO PLASTOMILL 2D25W available from Toyo Seiki Seisaku-Sho, Ltd.) at the resin temperature of 230° C. to obtain a kneaded mixture.

Example 5

A kneaded mixture was prepared in the same manner as Example 4 except that the amount of α,α'-bis(t-butylperoxy) diisopropylbenzene (PERBUTYL P available from NOF Corporation) was 16 g.

The modified propylene homopolymer, the pellets, and the kneaded mixtures, prepared in Example 1 to 5, were subjected to a wetting tension test (a surface tension measurement) and an acid-modified content measurement in the following manner.

The results are shown in Table 2.

Comparative Example 1

The propylene polymer produced in Production Example 2 was press-formed into a sheet to obtain a molded polypropylene article.

This molded polypropylene article prepared without the modification was subjected to the wetting tension test.

The results are shown in Table 2.

Example 6

Modification of Propylene Homopolymer 150 g of the propylene homopolymer produced in Production Example 2 was introduced into a 1 L separable three-necked flask equipped with an impeller and heated to 160° C., and thereto were added 1.88 ml of di-t-butyl peroxide and 4.0 g of maleic anhydride.

The mixture was stirred for about 30 minutes, introduced into a stainless vat, and allowed to cool, to obtain a modified propylene homopolymer.

Example 7

Modification of Propylene Homopolymer

A modified propylene homopolymer was prepared in the same manner as Example 6 except for using 15.0 g of acrylic acid instead of 4.0 g of maleic anhydride.

The modified propylene homopolymers produced in Examples 6 and 7 were subjected to a wetting tension test (a surface tension measurement), an acid-modified content measurement, and an adhesiveness evaluation in the following manner.

The results are shown in Table 3.

Comparative Example 2

The propylene polymer produced in Production Example 3 was subjected to the wetting tension test (the surface tension measurement), the acid-modified content measurement, and the adhesiveness evaluation.

The results are shown in Table 3.

<Measurement of Acid-Modified Content>

The acid-modified content was determined as follows: a blend of a non-modified polypropylene and an organic acid was pressed using a 0.1 mm spacer; the blend was subjected to IR measurement; a calibration curve was obtained from the characteristic carbonyl absorption (1,600 to 1,900 cm$^{-1}$) and the amount of the organic acid; and a pressed plate of an acid-modified polymer was subjected to the IR measurement.

The IR measurement apparatus used was FT/IR-5300 available from Jasco Corporation.

<Wetting Tension Test>

A wetting tension of a plastic film, which represented a measure of retention of an ink, a coating, or an adhesive, etc. of the film, was evaluated.

It is empirically known that, when the plastic film has a larger wetting tension, the retention of an ink, a coating, or an adhesive, etc. is increased.

The evaluation was carried out according to "*Plastic—film and sheet—wetting tension testing method*" of JIS K6768.

A modified propylene polymer was sandwiched between Teflon sheets, and pressed at 230° C. using a 0.3 mm spacer to prepare a film for the evaluation.

The film was left at the room temperature for 8 hours or more.

A mixed liquid for a wetting tension test available from Wako Pure Chemical Industries, Ltd. was infiltrated into a cotton bud, and coated to the film. In a case where the film was not broken and maintained the original state in 2 seconds after the coating, the film was evaluated as "wetting".

The film was subjected to tests using mixed liquids having different surface tensions in increasing order of the surface tensions. The maximum surface tension of a mixed liquid, under which the film was evaluated as "wetting", was obtained as the wetting tension of the film.

<Adhesiveness Evaluation>

The adhesiveness evaluation was carried out according to a peeling adhesive strength testing method of JIS K6854.

A modified propylene polymer was introduced into a glass sample bottle, and heated and melted in an oil bath at 200° C.

The polymer was uniformly coated by a glass rod onto 100 mm-length part of an aluminum plate strip having a width of 25 mm, a length of 150 mm, and thickness of 0.5 mm from the bottom.

The same aluminum plate strip was superposed thereon, and immediately press-bonded by ying 5 MPa pressure at 200° C. for 3 minutes by a hot pressing apparatus.

The sample was left at the room temperature for 8 hours or more, and subjected to a T type peeling test.

An autograph DCS-2000 available from Shimadzu Corporation was used in the test, and a maximum point load at a peeling rate of 100 mm/minute was measured as an adhesion strength.

The adhesiveness of the polymer was observed by using the evaluation standards given below.

Excellent: The polymer was non-peelable.

Good: 80% or more of the bonding surface was peeled off due to material failure.

Fair: Material failure was observed in less than 80% of the bonding surface.

Poor: The polymer was peeled off at the interface (material failure was not observed and the coated sample remained on the coated surface.)

TABLE 2

Results of measuring properties of acid-modified polymers

| | Acid-modified content % by weight | Surface tension mN/m | [η] dL/g | Mw/Mn |
|---|---|---|---|---|
| Example 1 | 0.5 | 31 | 0.32 | 2.0 |
| Example 2 | 0.2 | 31 | 1.30 | 2.1 |
| Example 3 | 0.8 | 31 | 0.78 | 2.0 |
| Example 4 | 0.8 | 31 | 0.56 | 2.0 |
| Example 5 | 0.8 | 31 | 0.58 | 1.9 |
| Comparative Example | 0 | Less than 30 | 1.9 | 2.1 |

TABLE 3

Results of wetting tension test, acid-modified content measurement, and adhesiveness evaluation

| | Example 6 | Example 7 | Comparative Example 2 |
|---|---|---|---|
| organic acid | Maleic anhydride | Acrylic acid | — |
| surface tension (mN/m) | 33 | 33 | Less than 30 |
| acid-modified content (% by weight) | 1.37 | 6.4 | 0 |
| adhesiveness evaluation Observation | Good | Good | Fair |
| adhesiveness evaluation adhesion strength (kN/m) | 0.31 | 1.74 | 0.15 |

As shown in Tables 2 and 3, the modified propylene-based polymers of Examples showed increased surface tensions.

Further, it was clear from the results of the adhesiveness evaluation shown in Table 3 that adhesion strength was improved by the modification.

INDUSTRIAL APPLICABILITY

In the present invention, the propylene-based polymer with the particular property is modified to produce the modified propylene-based polymer, which can make a polyolefin more adhesive, stronger, or flexible, and is useful as a high-adhesive sealant, a modifier for providing a polyolefin with increased compatibility to an inorganic filler, etc.

The modified propylene-based polymer can be effectively used particularly as an adhesive for metals, paper, etc.

The invention claimed is:

1. A method for producing a modified propylene homopolymer, the method comprising:
    modifying a propylene homopolymer with a radical initiator and an organic acid;
    wherein the propylene homopolymer satisfies the conditions:
    (a) mmmm =20 to 60 mol %;
    (b) $[rrrr/(1-mmmm)] \leqq 0.1$;
    (c) rmrm>2.5 mol %;
    (d) $mm \times rr/(mr)^2 \leqq 2.0$; and
    (e) a weight ratio (W25) of components eluted at 25° C. or lower in a temperature programmed chromatography is 20 to 100% by weight.

2. The method according to claim 1, wherein the propylene homopolymer further satisfies at least one of the conditions:
    (f) a molecular weight distribution (Mw/Mn) measured by a gel permeation chromatography (GPC) is 5 or less; and
    (g) a limiting viscosity [η] measured in tetralin at 135° C. is 0.1 dL/g or more.

3. The method according to claim 1, wherein the propylene homopolymer is modified in an organic solvent.

4. The method according to claim 1, wherein the propylene homopolymer is modified in the molten state.

5. The method according to claim 1, wherein the radical initiator is a peroxide, and the organic acid is maleic anhydride, acrylic acid, or an alkyl acrylate.

6. The method according to claim 1, wherein the propylene homopolymer is modified in the presence of a styrene-based compound.

7. A modified propylene homopolymer obtained by the method according to claim 1.

8. An adhesive composition comprising the modified propylene homopolymer according to claim 7.

9. The adhesive composition according to claim 8, wherein the adhesive composition comprises 20 to 99% by weight of the modified propylene homopolymer and 1 to 80% by weight of a tackifying resin.

* * * * *